(12) United States Patent
Mochinushi

(10) Patent No.: US 9,451,139 B2
(45) Date of Patent: Sep. 20, 2016

(54) PORTABLE OPTICAL INSTRUMENT AND IMAGE PICKUP APPARATUS

(71) Applicant: OLYMPUS CORPORATION, Tokyo (JP)

(72) Inventor: Hidenobu Mochinushi, Tokyo (JP)

(73) Assignee: OLYMPUS CORPORATION (JP)

(*) Notice: Subject to any disclaimer, the term of this patent is extended or adjusted under 35 U.S.C. 154(b) by 0 days.

(21) Appl. No.: 14/603,883

(22) Filed: Jan. 23, 2015

(65) Prior Publication Data
US 2015/0215506 A1    Jul. 30, 2015

(30) Foreign Application Priority Data

Jan. 28, 2014 (JP) ................................. 2014-013658
Jan. 28, 2014 (JP) ................................. 2014-013659

(51) Int. Cl.
| | | |
|---|---|---|
| *H04N 5/225* | (2006.01) | |
| *G03B 15/05* | (2006.01) | |
| *G03B 13/02* | (2006.01) | |

(52) U.S. Cl.
CPC ............ *H04N 5/2254* (2013.01); *G03B 15/05* (2013.01); *H04N 5/2256* (2013.01); *G03B 13/02* (2013.01); *G03B 2215/0507* (2013.01)

(58) Field of Classification Search
None
See application file for complete search history.

(56) References Cited

U.S. PATENT DOCUMENTS

| | | | | |
|---|---|---|---|---|
| 5,005,032 A | * | 4/1991 | Burnham | G03B 13/06 396/178 |
| 5,084,721 A | * | 1/1992 | Burnham | G03B 15/05 396/350 |
| 5,212,510 A | * | 5/1993 | Baxter | G03B 15/05 359/511 |
| 5,485,234 A | * | 1/1996 | Stephenson, III | G03B 15/05 396/178 |
| D437,867 S | * | 2/2001 | Hollington | D16/209 |
| 2002/0078618 A1 | * | 6/2002 | Gaber | F41G 1/345 42/123 |
| 2008/0060629 A1 | * | 3/2008 | Chang | F41B 5/123 124/25 |
| 2009/0103911 A1 | * | 4/2009 | Ikemizo | G03B 15/05 396/174 |
| 2010/0095578 A1 | * | 4/2010 | Elpedes | F41G 1/14 42/131 |

FOREIGN PATENT DOCUMENTS

JP        2001500990 A    1/2001

* cited by examiner

*Primary Examiner* — Timothy J Henn
*Assistant Examiner* — Quan Pham
(74) *Attorney, Agent, or Firm* — Volpe and Koenig, P.C.

(57) ABSTRACT

The invention provides a portable optical instrument including: a body portion to which a lens barrel which holds a lens is fixed; a pop-up light emitting unit which projects illumination light forward; and a sighting device which includes an optical element which includes a concave-surface-shaped reflection surface and a sighting device light source opposed to the reflection surface, the sighting device forming a reflection light of the sighting device light source, wherein the optical element is disposed between the light emitting unit and the body portion.

5 Claims, 17 Drawing Sheets

FIG. 12

|  | LIGHT EMITTING UNIT HOUSED STATE | LIGHT EMITTING UNIT PROJECTED STATE |
|---|---|---|
| SIGHTING DEVICE LODGED STATE | INHIBIT LIGHT EMISSION OF LIGHT EMITTING UNIT<br><br>STOP SIGHTING DEVICE LIGHT SOURCE | PERMIT LIGHT EMISSION OF LIGHT EMITTING UNIT<br><br>STOP SIGHTING DEVICE LIGHT SOURCE |
| SIGHTING DEVICE STANDING STATE | — | INHIBIT LIGHT EMISSION OF LIGHT EMITTING UNIT<br><br>PERFORM LIGHT EMISSION OF SIGHTING DEVICE LIGHT SOURCE |

FIG. 16
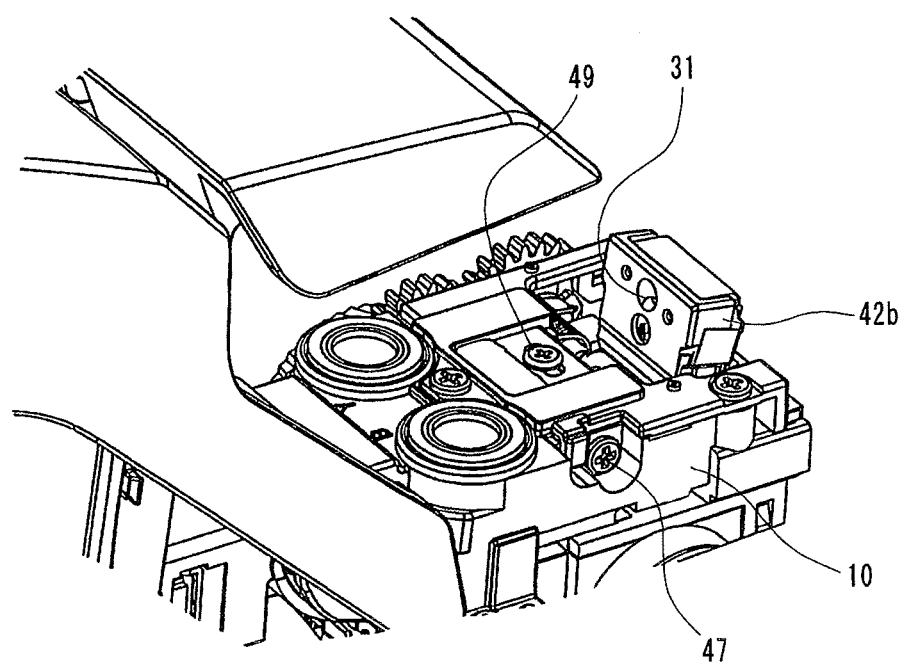
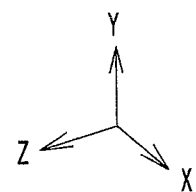

PORTABLE OPTICAL INSTRUMENT AND IMAGE PICKUP APPARATUS

CROSS REFERENCE TO RELATED APPLICATION

This application claims benefit of Japanese Applications No. 2014-013658 filed in Japan on Jan. 28, 2014, No. 2014-013659 filed in Japan on Jan. 28, 2014, the entire contents of which are incorporated herein by this reference.

BACKGROUND OF THE INVENTION

1. Field of the Invention

The present invention relates to a portable optical instrument and an image pickup apparatus that are provided with a sighting device.

2. Description of the Related Art

In an image pickup apparatus for performing telephotography and in a portable optical instrument such as a telescope, since a field of view is narrow, it is difficult to introduce a desired object or observation object within the field of view. Therefore, there is known a method of making the introduction of the object easy by attaching a sighting device as disclosed in Japanese Translation of PCT Application Publication No. 2001-500990 to the portable optical instrument, for example.

SUMMARY OF THE INVENTION

A portable optical instrument according to one aspect of the present invention comprises: a body portion to which a lens barrel that holds a lens is fixed; a light emitting unit including a leg portion that swings relatively to the body portion around a first rotation shaft which is parallel to an axis orthogonal to an optical axis of the lens, and a light source portion for illumination provided at a front end of the leg portion, the light emitting unit moving between a housed state in which the leg portion is along an outer surface of the body portion and a projected state in which the leg portion stands up with respect to the outer surface and the light source portion projects from the body portion; and a sighting device which includes an optical element having a concave-surface-shaped reflection surface, and a sighting device light source opposed to the reflection surface, the sighting device being configured to form a reflection light of the sighting device light source, wherein the optical element is disposed between the body portion and the light emitting unit when the light emitting unit is in the housed state.

An image pickup apparatus according to one aspect of the present invention comprises: a lens barrel which holds an image pickup lens; a body portion to which the lens barrel is fixed; a light emitting unit including a leg portion that swings relatively to the body portion around a first rotation shaft which is parallel to an axis orthogonal to an optical axis of the image pickup lens, and a light source portion for illuminating an object, which is provided on a front end of the leg portion, the light emitting unit moving between a housed state in which the leg portion is along an outer surface of the body portion and a projected state in which the leg portion stands up with respect to the outer surface and the light source portion projects from the body portion; and a sighting device which includes an optical element having a concave-surface-shaped reflection surface, and a sighting device light source opposed to the reflection surface, the sighting device being configured to form a reflection light of the sighting device light source, wherein the sighting device is disposed so as to penetrate the opening portion when the light emitting unit is in the projected state, the optical element is held by an optical element holding frame which swings relatively to the body portion around a rotation shaft parallel to the first rotation shaft, the optical element holding frame is brought into a lodged state in which the optical element holding frame is along the outer surface of the body portion, when the sighting device is not used, and the optical element holding frame is brought into a standing state in which the optical element holding frame stands up with respect to the outer surface, when the sighting device is used, and the image pickup apparatus enables an operation for moving only the light emitting unit from the housed state to the projected state, and operation for moving the light emitting unit from the housed state to the projected state and simultaneously moving the optical element holding frame from the lodged state to the standing state.

BRIEF DESCRIPTION OF THE DRAWINGS

FIG. 12 is a table showing conditions of an operation of the light emitting unit and the sighting device;

FIG. 16 is a view showing a state where a cover member that covers a light source position changing mechanism is removed from a body portion.

DETAILED DESCRIPTION OF THE PREFERRED EMBODIMENTS

Figure 1:
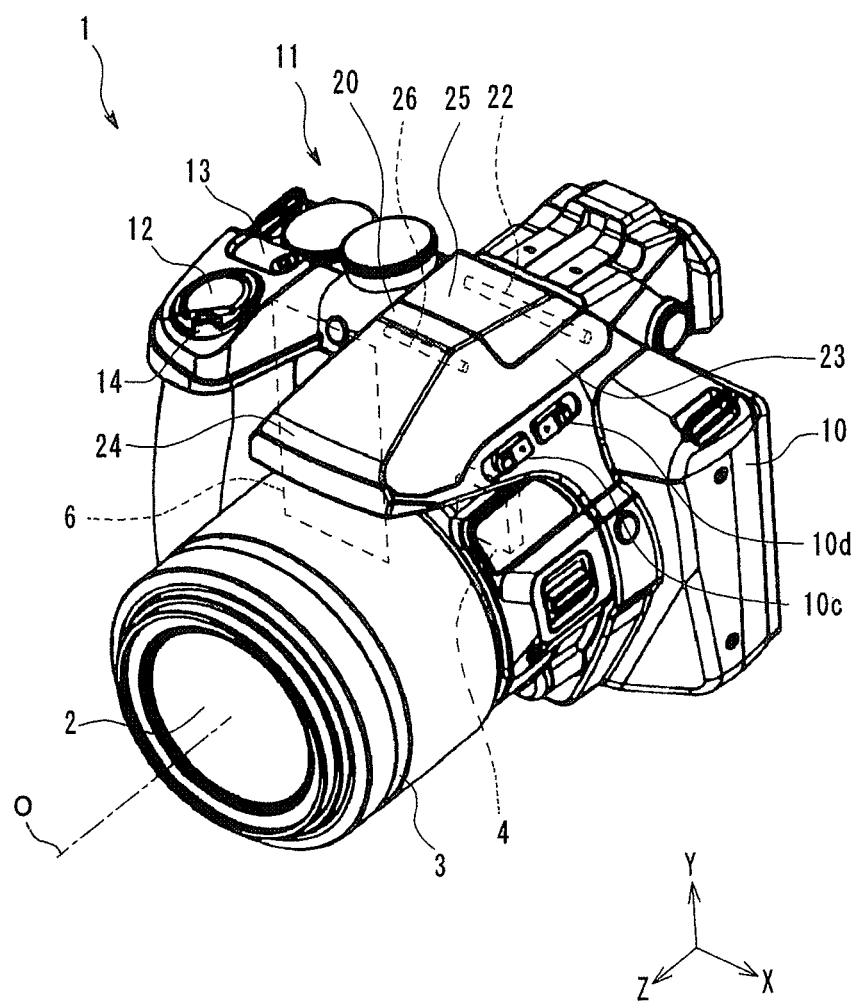
FIG. 1 is a perspective view of an image pickup apparatus on a front side thereof in a state where a light emitting unit is housed.

Hereinafter, preferred embodiments of the present invention will be described referring to the drawings. It is noted that, in the following description, contraction scales are made different for respective elements in order to make each of the elements have a degree of size recognizable on the drawings, and the present invention is not limited to only configurations having the number of elements, shapes of the elements, ratios of sizes of the elements and relative positional relations between the elements that are shown in the drawings.

An external appearance of an image pickup apparatus 1 as an example of a portable optical instrument is shown in FIG. 1 through FIG. 4. The image pickup apparatus 1 of the present embodiment has a configuration in which a light emitting unit 20 and a sighting device 30 are incorporated in a body portion 10 which holds an image pickup device 4 such as a CCD and a CMOS image sensor. Further, a lens barrel 3 is fixed on the body portion 10, the lens barrel 3 holding an image pickup lens 2 which forms an object image on a light receiving surface of the image pickup device 4.

The image pickup apparatus 1 is a so-called digital camera which converts an optical image formed by the image pickup lens 2 into an electric signal by the image pickup device 4 and generates and records an image data based on the electric signal. It is noted that, in the present embodiment shown in the figures, the image pickup apparatus 1 has a configuration in which the body portion 10 and the lens barrel 3 cannot be separated, but the image pickup apparatus 1 may have a configuration of a so-called lens interchange type in which the lens barrel 3 and the body portion 10 can be separated.

It is noted that, in the following description, an axis parallel to an optical axis O of the image pickup lens 2 is referred to as a Z axis, and two axes orthogonal to each other on a plane orthogonal to the Z axis is referred to as an X axis and a Y axis. The Z axis and the X axis are horizontal axes and the Y axis is a vertical axis in a state where the image pickup apparatus 1 is held in a so-called upright state. The X, Y and Z axes are shown appropriately in the drawings.

Further, in the following description, with respect to directions along the Z axis, a direction toward an object (an object of image pickup) is referred to as a fore side and an image side (a side of the image pickup device) is referred to as a rear side. Furthermore, with respect to directions along the X axis, in the state where the image pickup apparatus 1 is held in the so-called upright state, a right-hand direction and a left-hand direction when viewed from behind are referred to as a rightward direction and a leftward direction. Moreover, with respect to directions along the Y axis, an upward direction and a downward direction in the state where the image pickup apparatus 1 is held in the so-called upright state are referred to as an upward direction and a downward direction, respectively. It is noted that these references to the directions are appropriately given for the sake of description.

The image pickup apparatus 1 is provided with the lens barrel 3, the image pickup device 4, an image display apparatus 5, a control apparatus 6, an operation portion 11, the light emitting unit 20 and the sighting device 30 in the body portion 10. Further, the image pickup apparatus 1 is provided with a battery housing space, not shown, for housing a battery as a power source and a recording medium such as a flash memory. Besides, it may be configured such that one or both of the battery and the flash memory are fixed in the image pickup apparatus 1.

Figure 2:
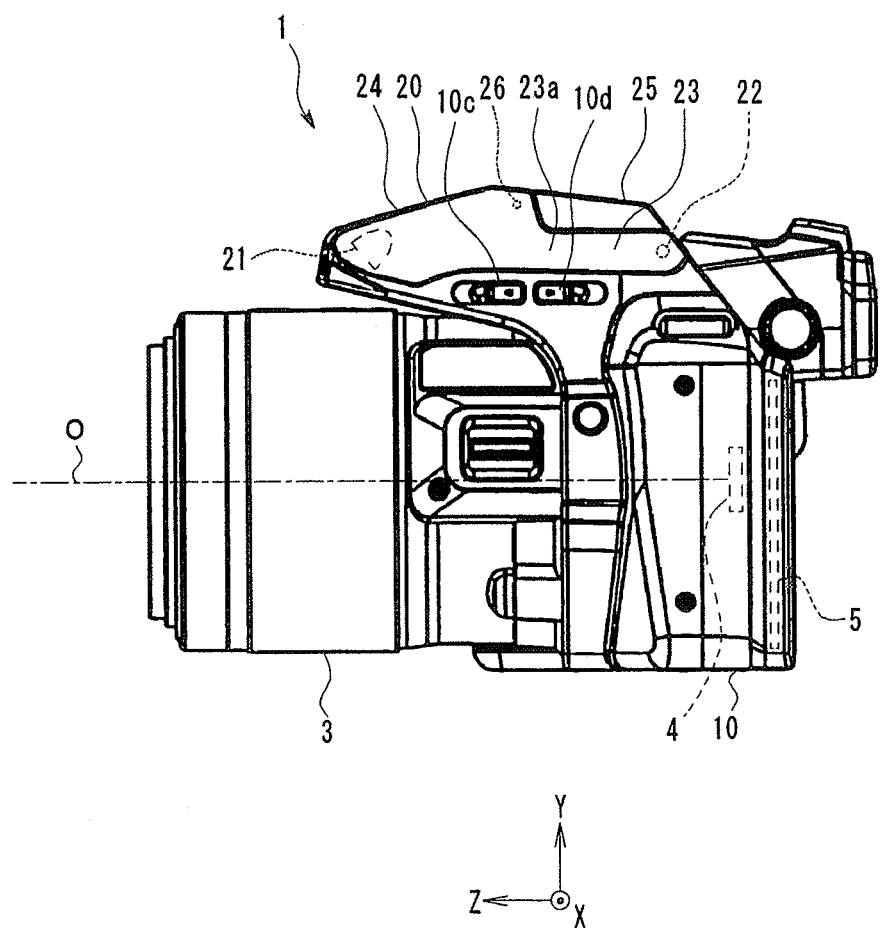
FIG. 2 is a side view of the image pickup apparatus on a left side thereof in a state where the light emitting unit is housed.
Figure 3:
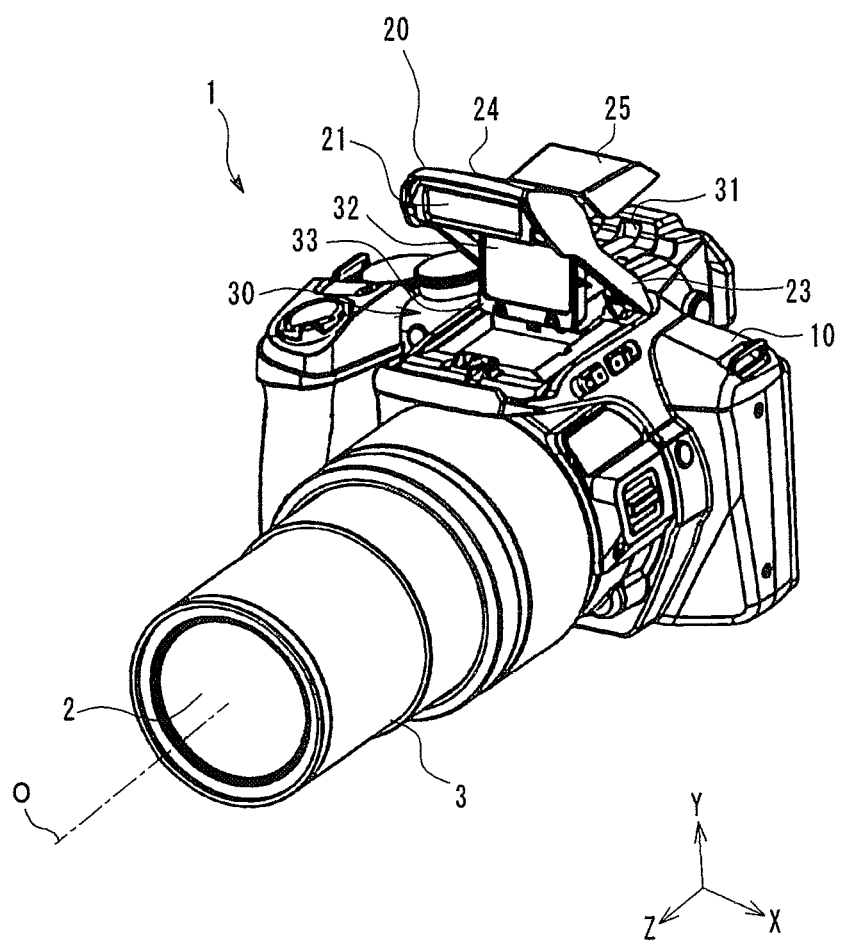
FIG. 3 is a perspective view of the image pickup apparatus on a front side thereof in a state where the light emitting unit is projected.
Figure 4:
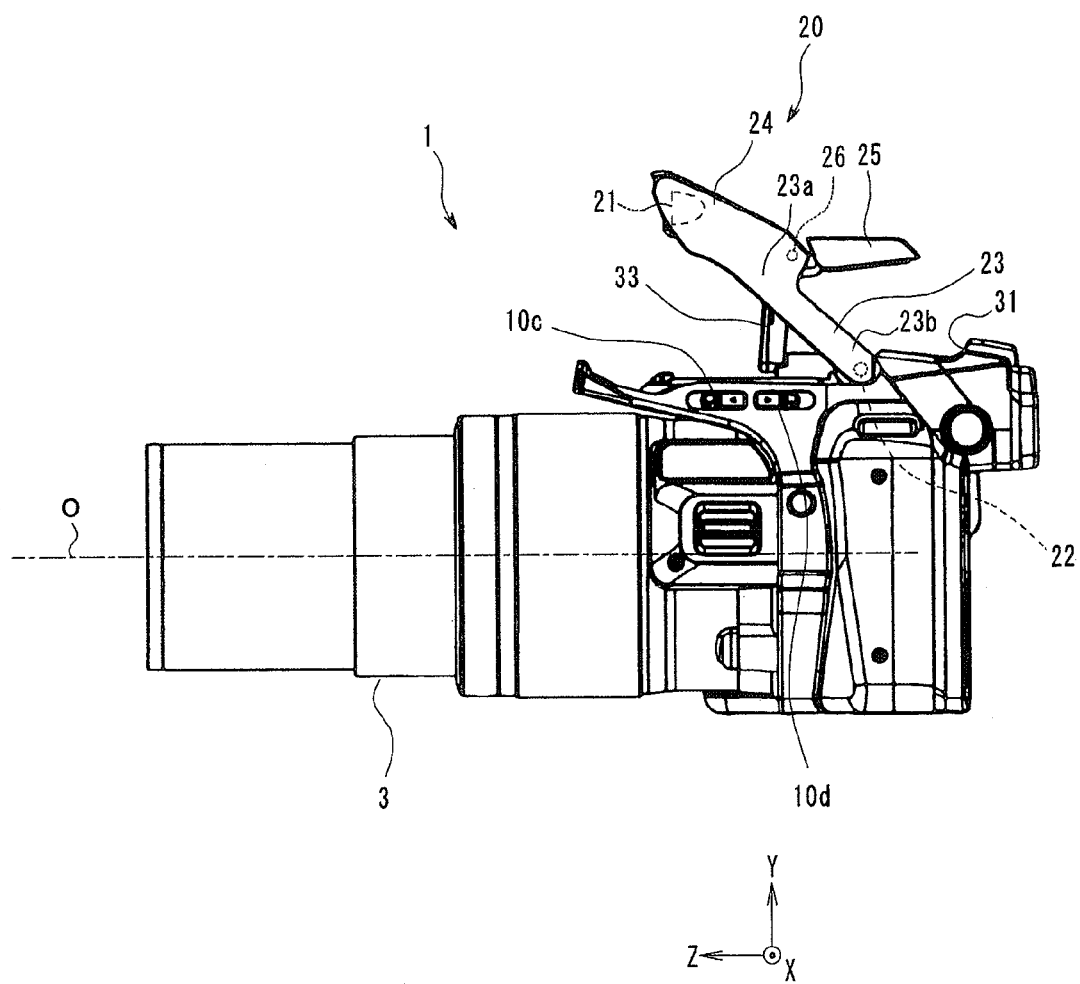
FIG. 4 is a side view of the image pickup apparatus on a left side thereof in a state where the light emitting unit is projected.

The lens barrel 3 holds the image pickup lens 2 which is a zooming lens capable of changing a focal length. In FIGS. 1 through 4 showing the external appearance of the image pickup apparatus 1, FIG. 1 and FIG. 2 show a case where the focal length of the image pickup lens 2 is set to be the shortest, and FIG. 3 and FIG. 4 show a case where the focal length of the image pickup lens 2 is set to be the longest. It is noted that, in the present embodiment shown in the drawings, a length of the lens barrel 3 changes with a change of the focal length of the image pickup lens 2, but the length of the lens barrel 3 may be fixed. The lens barrel 3 has a configuration to change the focal length of the image pickup lens 2 using a power of an electric actuator.

The image display apparatus 5 is constituted by a liquid display device or an EL display device, and displays and outputs an image. The image display apparatus 5 is disposed on a face directed to the rear side of the body portion 10. Besides, the image display apparatus 5 may be attached to the body portion 10 through a hinge mechanism so that a surface for display an image is movable with respect to the body portion 10.

The control apparatus 6 is configured to include an operation device (CPU), a storage device (RAM), an auxiliary storage device, an input/output device, a power control device, etc. and controls an operation of the image pickup apparatus 1 based on a predetermined program.

The operation portion 11 is constituted by a plurality of operation members for a user to input operation instructions of the image pickup apparatus 1 such as a lever switch, a dial switch, a button switch and a touch sensor. The operation portion 11 includes a plurality of switches of a release switch 12, a power switch 13, a zoom operation switch 14 and a back face switch 15 which are provided at the body portion 10. Besides, the operation portion 11 may include a tough panel provided on the surface for displaying an image, of the image display apparatus 5. Further, a part of the operation portion 11 may be provided at another electronic instrument connected with the body portion 10 through wire or wireless communication, such as a so-called remote controller.

The light emitting unit 20 is provided with a light source portion 21 that emits light for illuminating an object when picking up an image of the object. In the present embodiment, the light source portion 21 has a configuration of an electronic flash using a xenon tube. Besides, the light source portion 21 may have a configuration using an LED.

The light emitting unit 20 is disposed above the body portion 10. More particularly, the light emitting unit 20 is disposed at a position just above the lens barrel 3 when the image pickup apparatus 1 is in the upright state.

Figure 5:
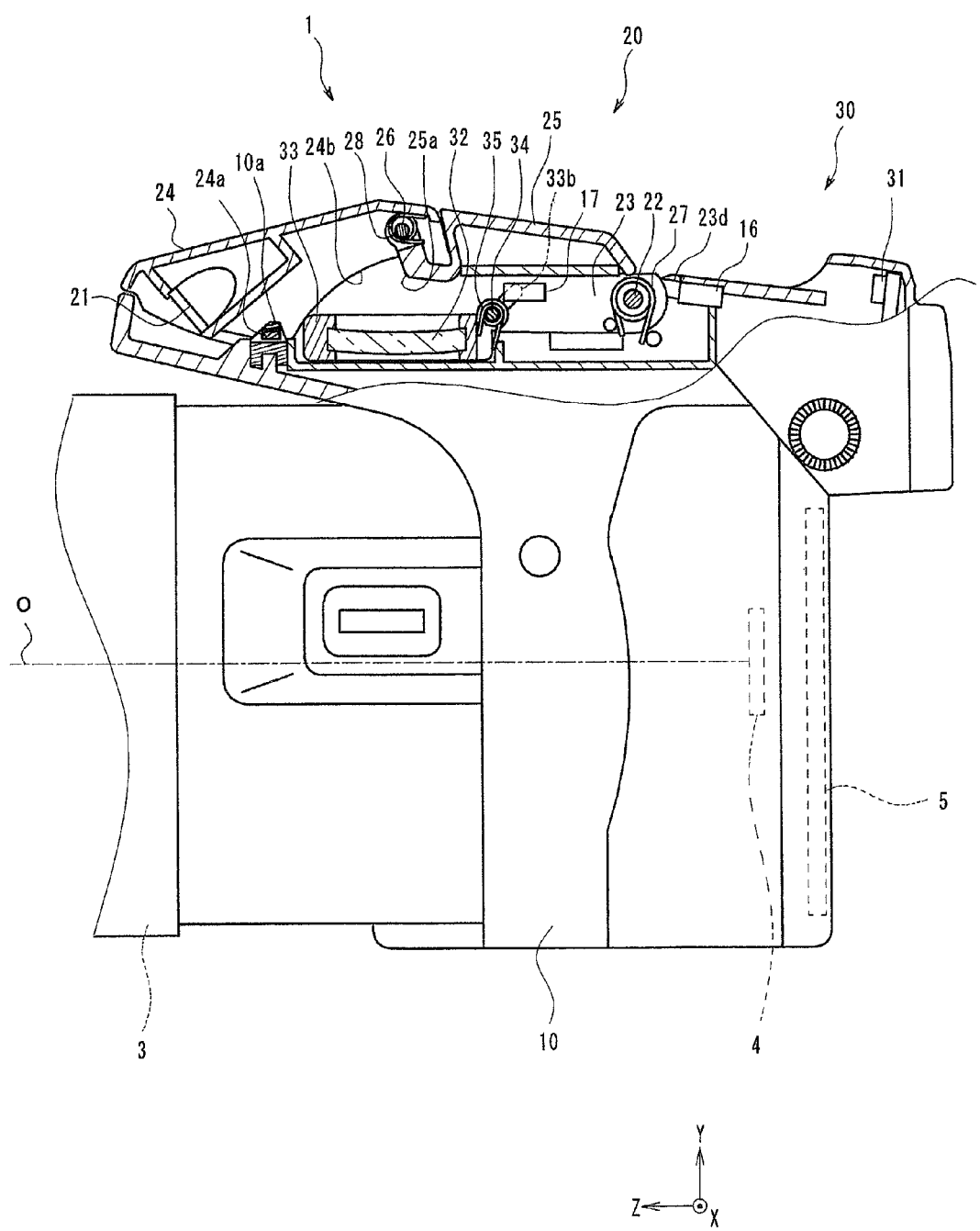
FIG. 5 is a sectional view of the light emitting unit in the housed state and a sighting device in a lodged state.
Figure 6:
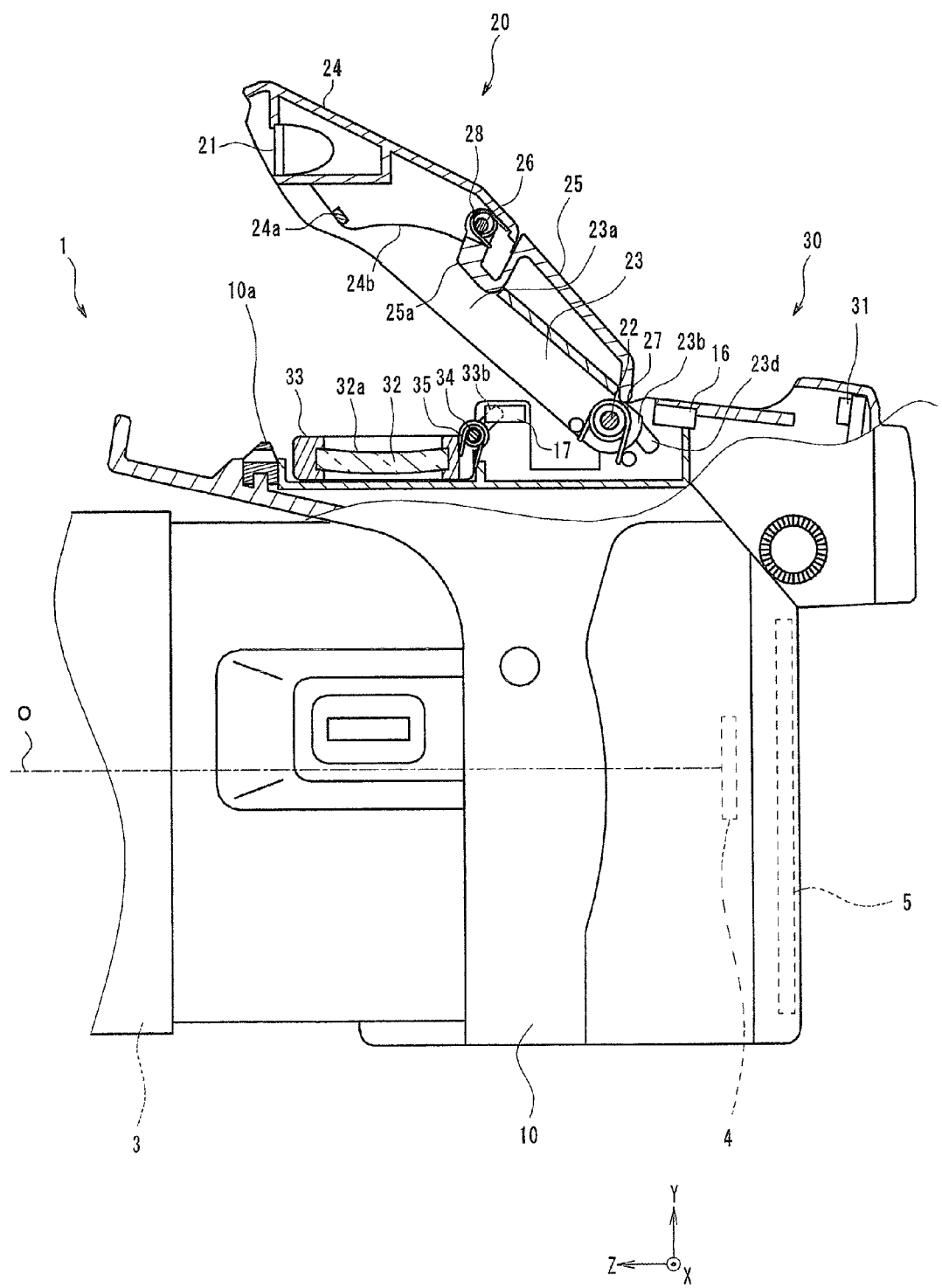
FIG. 6 is a sectional view of the light emitting unit in the projected state and the sighting device in the lodged state.

Further, the light emitting unit 20 is capable of housing the light source portion 21 in the body portion 10 during non-use as shown in FIGS. 1, 2 and 5, and projects from the body portion 10 popping up from a housed position during use as shown in FIGS. 3, 4 and 6. Such an arrangement structure of the light emitting unit 20 is generally called a pop-up flash or a retractable flash. In the following description, the state of the light emitting unit 20 as shown in FIGS. 1 and 2 is referred to as a housed state and the state of the light emitting unit 20 as shown in FIGS. 3 and 4 is referred to as a projected state.

Specifically, the light emitting unit 20 swings around a first rotation shaft 22 which is substantially parallel to the X axis with respect to the body portion 10, and has a leg portion 23 extending in a radial direction from the first rotation shaft 22, a front cover portion 24 which is fixed to a front end portion 23a of the leg portion 23, and the light source portion 21 fixed in the front cover portion 24.

The leg portion 23 extends forward from the first rotation shaft 22 and the front cover member 24 and the light source portion 21 are arranged on a front side of the first rotation shaft 22. The leg portion 23 swings around the first rotation shaft 22 between two positions, i.e. a position of a housed state where the leg portion is lodged forward with the first rotation shaft 22 as a pivot shaft along an upper surface of the body portion 10, as shown in FIGS. 1, 2 and 5, and a position of a projected state where the front end portion 23a is moved upward with respect to the housed state, as shown in FIGS. 3, 4 and 6.

The leg portion 23 has an opening portion 23c passing through the leg portion 23 in a direction along the Z axis (a direction parallel to the optical axis O) in the projected state. The sighting device 30 passes through the opening portion 23c when the leg portion 23 is in the projected state, as described later.

The front cover portion 24 covers the light source portion 21 when the leg portion 23 is in the housed state and exposes the light source portion 21 to the fore side (in a direction toward the object) when the leg portion 23 is in the projected state. The front cover portion 24 is a lid-like member having a concave shape upwardly, as an example in the present embodiment, and covers and hides the light source portion 21 when the leg portion 23 is in the housed state. Besides, it may be configured that the light source portion 21 is exposed outside also in the housed state.

A rear cover portion 25 is disposed to swing around a second rotation shaft 26 provided in the vicinity of the front end portion 23a of the leg portion 23. The second rotation shaft 26 is parallel to the first rotation shaft 22 and provided at a position above the opening portion 23c when the leg portion 23 is in the projected state.

The rear cover portion 25 is a lid-like member which swings around the second rotation shaft 26 to thereby open and close the opening portion 23c. The rear cover portion 25 has a posture along the leg portion 23 when the leg portion 23 is in the housed state to close the opening portion 23c. Further, the rear cover portion 25 takes a posture of a state of closing the opening portion 23c or a posture of a state of opening the opening portion 23c in accordance with an action of the sighting device 30, when the leg portion 23 is in a projected state, as described later.

Details of configurations and operations of the leg portion 23 and the rear cover portion 25 in the light emitting unit 20 will be described later.

The sighting device 30 is provided with a sighting device light source 31, an optical element 32 and an optical element holding frame 33. The sighting device 30 has a configuration generally called as a dot sight. The sighting device light source 31 is disposed on an upper surface of the body portion 10 and at a position just above the optical axis O. The sighting device light source 31 is a dot-like light source and is an LED in the present embodiment.

Figure 8:
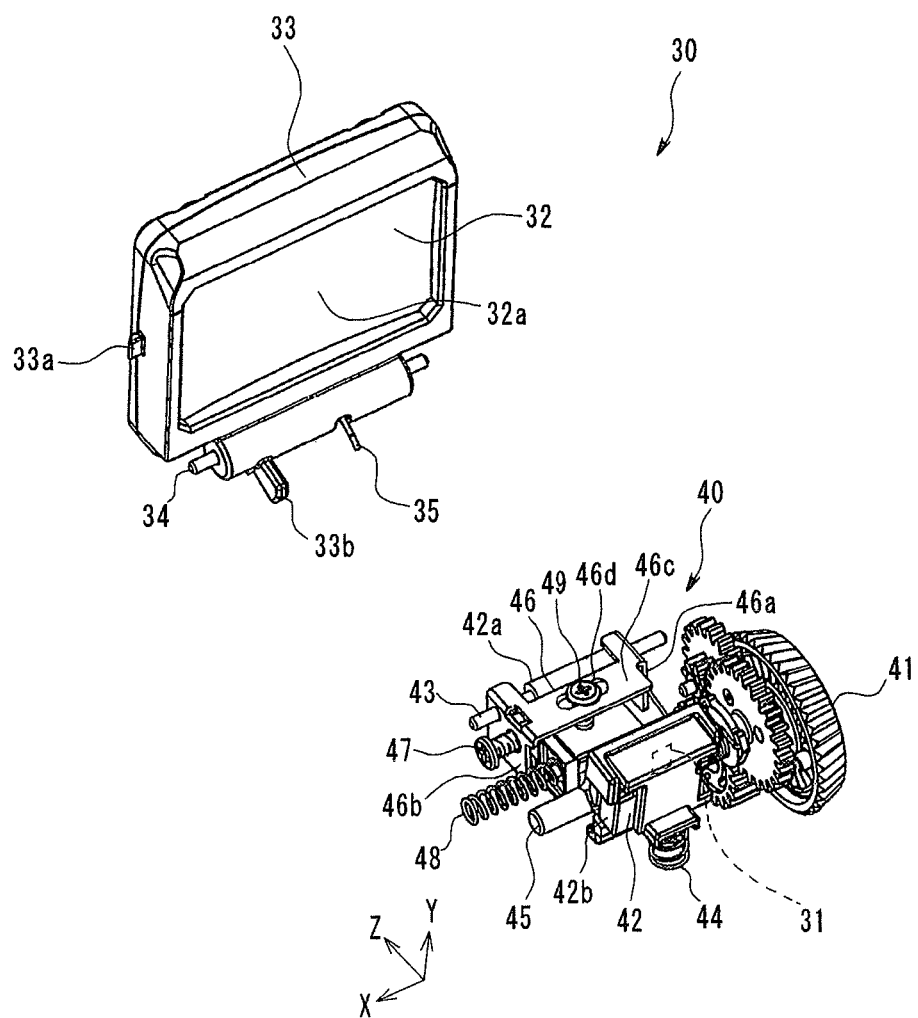
FIG. 8 is a perspective view of the sighting device only when viewed from behind.

The optical element 32 is held by the optical element holding frame 33. The optical element holding frame 33 is a frame-like member surrounding a periphery of the optical element 32. As shown in FIG. 8, as an example in the present embodiment, the optical element holding frame 33 has a rectangular shape, surrounds the periphery of the optical element 32 like a picture frame, and holds the optical element 32.

The optical element holding frame 33 swings around a third rotation shaft 34 which is approximately parallel to the first rotation shaft 22 in front of the sighting device light source 31. One of four sides of the optical element holding frame 33, which has a rectangular outer shape, is disposed to be approximately parallel to the third rotation shaft 34 and closer to the third rotation shaft 34.

Figure 7:
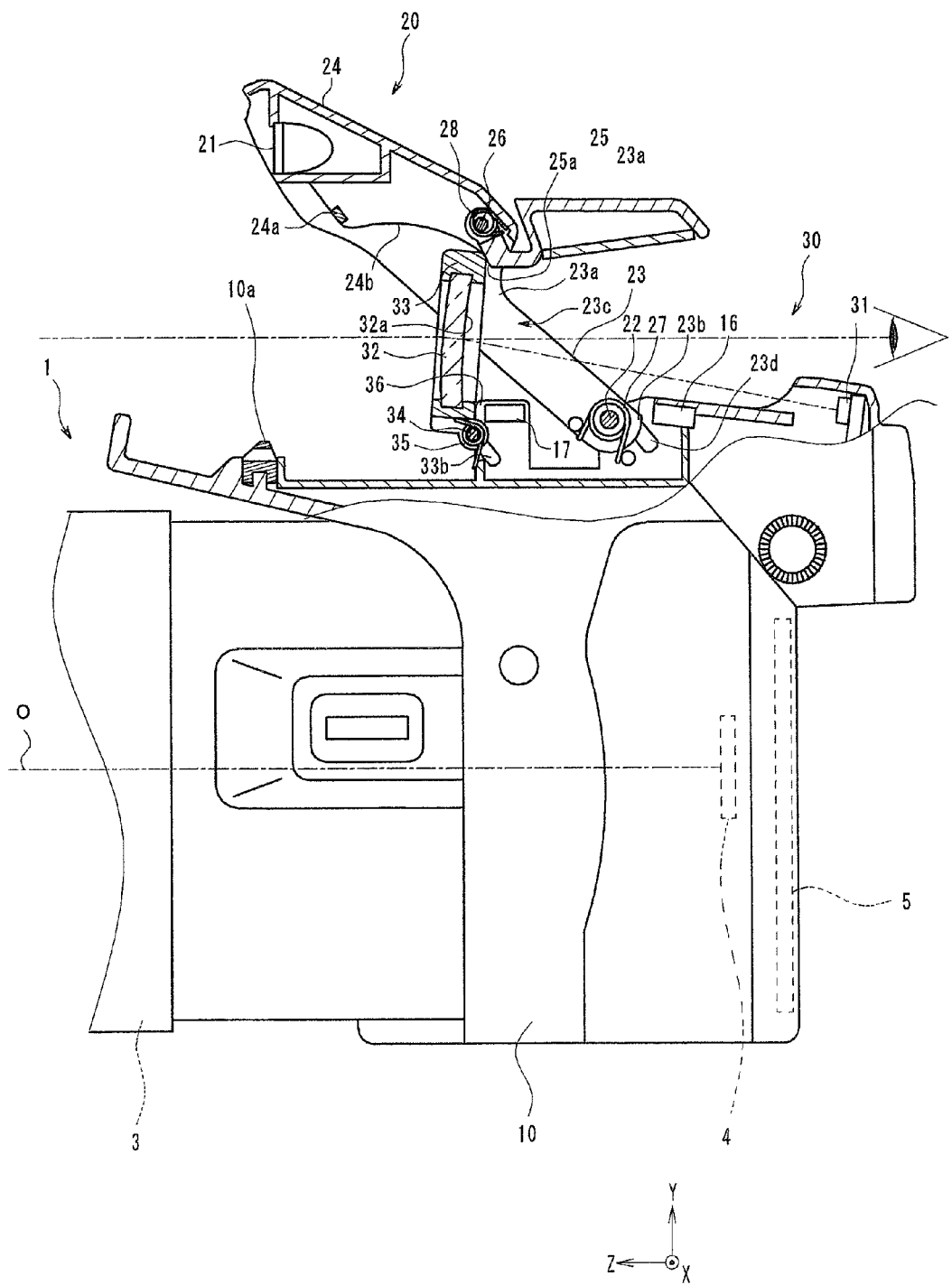
FIG. 7 is a sectional view of the light emitting unit in the projected state and the sighting device in a raised state.

The optical element holding frame 33 swings around the third rotation shaft 33 between two positions, i.e. a position of a lodged state where the frame is lodged forward with the third rotation shaft 34 as a pivot shaft to lie along the upper surface of the body portion 10, as shown in FIG. 5, and a position of a standing state where the frame stands up from the upper surface of the body portion 10, as shown in FIG. 7.

As shown in FIG. 5, when the optical element holding frame 33 is in the lodged state and the leg portion 23 of the light emitting unit 20 is in the housed state, the optical element holding frame 33 is covered by the front cover portion 24 and the rear cover portion 25 from the upper side. Therefore, when the light emitting unit 20 is in the housed state, it is possible to prevent adhesion of dust to the optical element 32 and a damage of the optical element 32 by a shock being added.

A center of the optical element 32 is located just above the optical axis O when the optical element 32 is held by the optical element holding frame 33. Further, main surfaces of the optical element 32 face in front-back directions when the optical element holding frame 33 is in the standing state.

That is, as shown in FIG. 7, when the optical element holding frame 33 is in the standing state and the rear cover portion 25 is located at the position to open the opening portion 23c, the optical element 32 has the main surface to face the sighting device light source 31 which is disposed rearward. In the following description, when the optical element holding frame 33 is in the standing state, the main surface facing the sighting device light source 31 is referred to as a back surface 32a.

Figure 9:
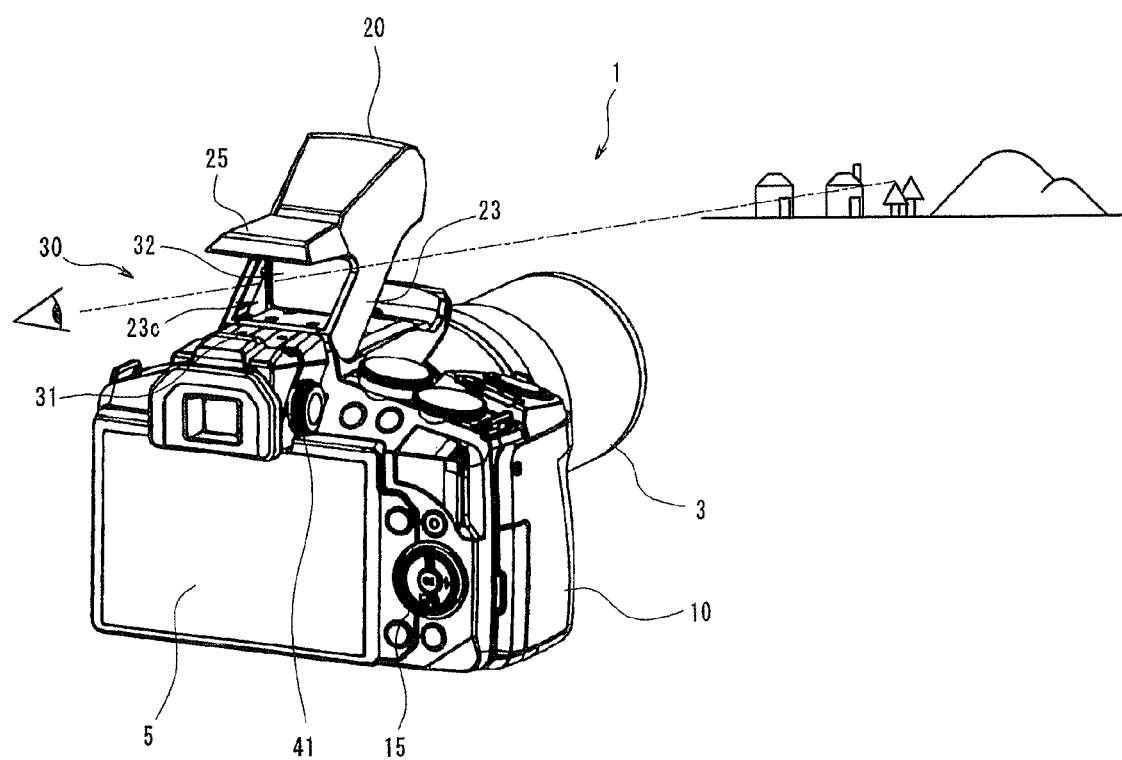
FIG. 9 is a diagram for explaining a situation where the sighting device is used in the image pickup apparatus.
Figure 10:
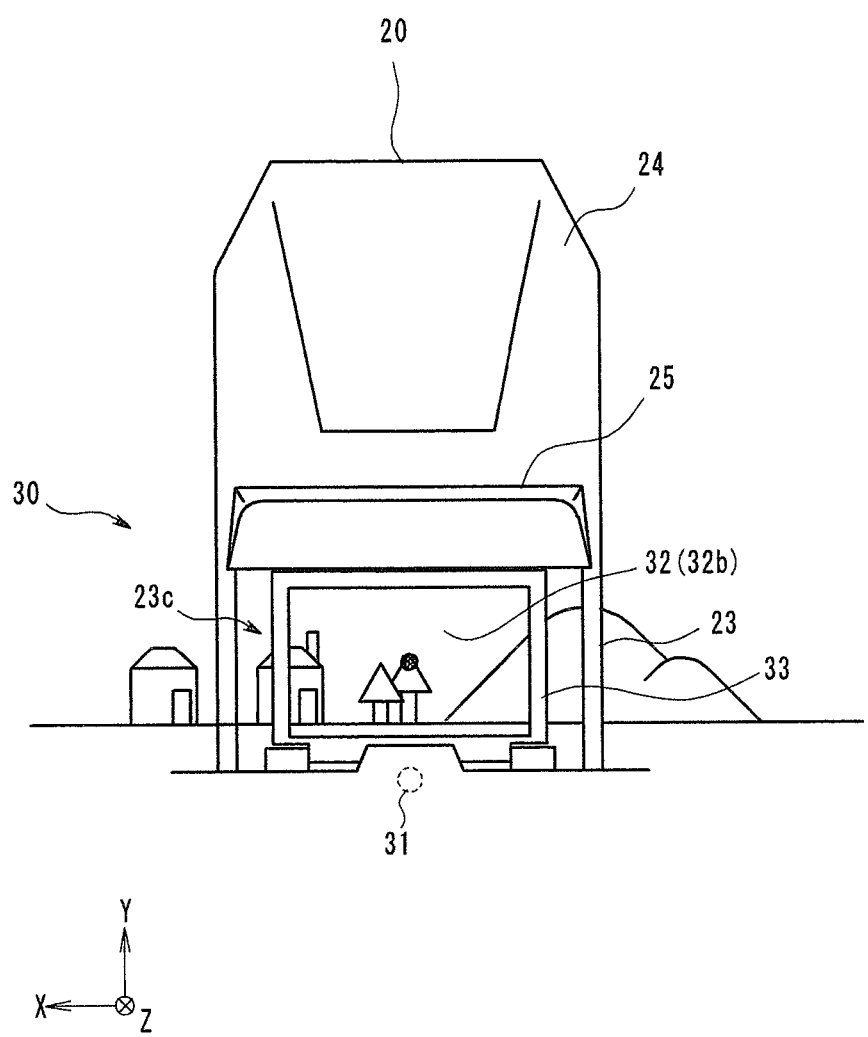
FIG. 10 is a diagram showing a state of peering into the sighting device.

Further, the optical element 32 is located in front of the opening portion 23c of the leg portion 23 when the optical element holding frame 33 is in the standing state. Therefore, as shown in FIGS. 7 and 9, when the optical element holding frame 33 is in the standing state and the rear cover portion 25 is located at the position to open the opening portion 23c, an user of the image pickup apparatus 1 can peep the back surface 32a of the optical element 32 through the opening portion 23c from behind of the image pickup apparatus 1. It is noted that details of a mechanism for swinging the optical element holding frame 33 will be described later.

The optical element 32 is constituted by a member such as transparent glass or resin and at least the back surface (reflection surface) 32a is formed into a paraboloid shape or a concave-surface shape approximating to a paraboloid. Further, the back surface 32a is formed as a half mirror or a dichroic mirror which reflects light in a predetermined wavelength range as a part of visible light wavelength range and transmits light in the other wavelength range.

When the optical element holding frame 33 is in the standing state, the sighting device light source 31 is located in the vicinity of a focal point of the back surface 32a as the paraboloid. The back surface 32a of the optical element 32 reflects light emitted from the sighting device light source 31 to be parallel to the optical axis O toward the rear side.

In the present embodiment, the back surface 32a is formed as the dichroic mirror and the back surface 32a reflects light in a predetermined wavelength band including a wavelength of the light emitted by the sighting device light source 31 and transmits light in the other wavelength bands. More specifically, the sighting device light source 31 of the present embodiment is an LED which emits red light and the back surface 32a reflects a red wavelength band emitted by the sighting device light source 31. That is, the optical element 32 in the present embodiment transmits light in blue and green wavelength bands.

Therefore, as shown in FIGS. 7 and 9, a view point of the user is located on an optical path of the light emitted by the sighting device light source 31 and reflected by the back surface 32a of the optical element 32, the user can visually recognize a dot-like reflection light of the sighting device light source 31 and an image of the object in front of the image pickup apparatus 1 passed through the optical element 32 to be superimposed with each other. Here, since the light of the sighting device light source 31 which is visually recognized by the user is parallel to the optical axis O, a position where the object image and the reflection light of the sighting device light source 31 are superimposed and a center of an image pickup range of the image pickup apparatus 1 approximately coincide with each other. Thus, the user can capture the object in the image pickup range of the image pickup apparatus 1 using the sighting device 30. Besides, the reflection light of the sighting device light source 31 may not have a dot shape but may have a shape of a cross, a shape of a scale, etc.

Next, the configuration and the operation of the light emitting unit 20, the rear cover portion 25 and the optical element holding frame 33 which are disposed movable with respect to the body portion 10 will be described.

The light emitting unit 20 swings relatively to the body portion 10 around the first rotation shaft 22 at a base end portion 23b of the leg portion 23, as described before. As shown in the sectional views of FIGS. 5 through 7, the leg portion 23 is urged in a direction to swing from the housed state to the projected state by a torsion coil spring 27 disposed around the first rotation shaft 22. That is, the torsion coil spring 27 urges the light emitting unit 20 in a direction that the light emitting unit 20 stands up upwardly from the body portion 10. Positioning of the leg portion 23 in the projected state is performed by the leg portion 23 coming in contact with a stopper, not shown, provided at the body portion 10 by an urging force of the torsion coil spring 27.

A hook portion 24a is formed at a position under the front cover portion 24 when the leg portion 23 is in the housed state. The hook portion 24a has a shape to be engaged with a first engaging claw 10a, as described later, provided at the body portion 10. The hook portion 24a and the first engaging claw 10a are engaged with each other when the leg portion 23 is in the housed state as shown in FIG. 5.

That is, in a state where the hook portion 24a and the first engaging claw 10a are engaged with each other, the leg portion 23 is held in the housed state and the light emitting unit 20 maintains the posture of being lodged. Then, when the engagement of the hook portion 24a and the first engaging claw 10a is released, the leg portion 23 in the housed state moves to the projected state by the urging force of the torsion coil spring 27.

The release of the engagement of the hook portion 24a and the first engaging claw 10a is performed by a first lever 10c by the user. The first lever 10c is disposed at a left side position of the optical unit 20 in the housed state on the upper surface of the body portion 10, as shown in FIGS. 1 and 2.

Figure 11:
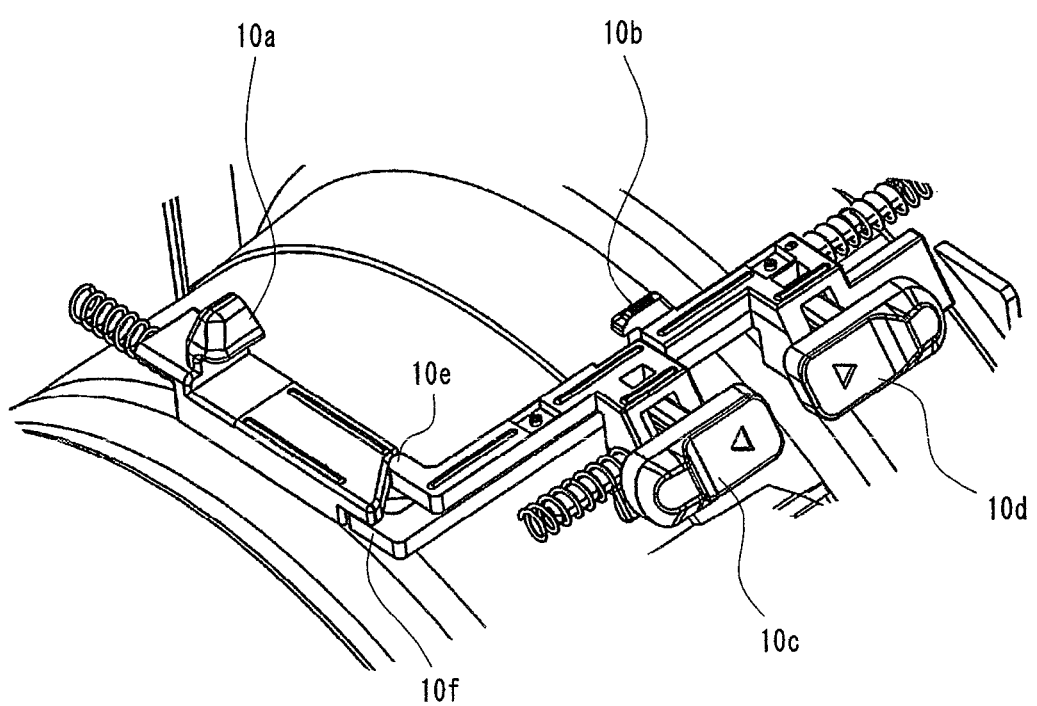
FIG. 11 is an exploded perspective view showing a structure of a first lever and a second lever for performing operations of the light emitting unit and an optical element holding frame.

As shown in FIG. 11, the first lever 10c is a sliding lever movable in the front and rear directions. In the rear of the first lever 10c, a second lever 10d is disposed, as described later. The first engaging claw 10a is disposed to be movable independently from the first lever 10c and the second lever 10d. The first engaging claw 10a is urged in a direction to maintain the engagement with the hook portion 24a by an urging member such as a spring.

The first lever 10c and the first engaging claw 10a are engaged with each other through a cam portion 10e, and the first lever 10c is moved forward and thereby the first engaging claw 10a moves in a direction to release the engagement with the hook portion 24a. Therefore, when the leg portion 23 is in the housed state (the state of FIG. 5), if the first lever 10c is moved forward, the engagement of the hook portion 24a and the first engaging claw 10a is released so that the leg portion moved to the projected state (the state of FIG. 6).

In order to move the leg portion 23 from the projected state to the housed state, the user pushes the light emitting unit 20 downward to engage the first engaging claw 10a and the hook portion 24a with each other.

Further, a first sensor 16 which detects whether or not the leg portion 23 is positioned in the housed state is disposed in the body portion 10. In the present embodiment, as an example, the first sensor 16 is a photo-interrupter disposed in the vicinity of the first rotation shaft 22. A light shield piece 23d which protrudes in a direction orthogonal to the first rotation shaft 22 is formed at the base end portion 23b of the leg portion 23.

As shown in FIG. 5, the light shield piece 23d is provided at a position where the light shield piece is detected by the first sensor 16 which is the photo-interrupter when the leg portion 23 is in the housed state. The control apparatus 6 of the image pickup apparatus 1 determines whether or not the leg portion 23 is in the housed state based on a signal outputted from the first sensor 16.

The rear cover portion 25 swings relative to the leg portion 23 around the second rotation shaft 26, as described before. The rear cover portion 25 is urged by a torsion coil spring 28 disposed around the second rotation shaft 26 in a direction to close the opening portion 23c.

At the rear cover portion 25, there is provided a contact portion 25a which comes in contract with the optical element holding frame 33 in the standing state. In a state where the contact portion 25a is contact with the optical element holding frame 33 in the standing state, as shown in FIG. 7, the rear cover portion 25 is positioned in a state of opening the opening portion 23c.

Therefore, when the optical element holding frame 33 is in the lodged state, as shown in FIG. 5 or 6, the rear cover portion 25 is positioned to close the opening portion 23c by an urging force of the torsion coil spring 28 irrespective of the position of the leg portion 23. On the other hand, when the optical element holding frame 33 is in the standing state, as shown in FIG. 7, the rear cover portion 25 is pushed from below by the optical element holding frame 33, and thereby positioned in a state of opening the opening portion 23c. That is, the rear cover portion 25 swings in accordance with the swinging of the optical element holding frame 33.

The optical element holding frame 33 swings relative to the body portion 10 around the third rotation shaft 34, as described before. The optical element holding frame 33 is urged by a torsion coil spring 35 disposed around the third rotation shaft 34 in a direction to swing from the lodged state to the standing state. The optical element holding frame 33 comes in contact with a stopper 36 (shown in FIG. 7) provided at the body portion 10 by an urging force of the torsion coil spring 35. Positioning of the optical element holding frame 33 in the standing state is performed by the optical element holding frame 33 coming in contact with the stopper 36.

As shown in FIG. 8, a hook portion 33a which protrudes laterally is formed on an outer side surface of the optical element holding frame 33. The hook portion 33a has a shape to be engaged with a second engaging claw 10b provided at the body portion, as described later. The hook portion 33a and the second engaging claw 10b are engaged with each other when the optical element holding frame 33 is in the lodged state.

That is, in the state where the hook portion 33a and the second engaging claw 10b are engaged with each other, the optical element holding frame 33 is held in the lodged state, as shown in FIG. 5. Then, when the engagement between the hook portion 33a and the second engaging claw 10b is released, the optical element holding frame 33 in the lodged state is moved to the standing state by the urging force of the torsion coil spring 35.

The release of the engagement of the hook portion 33a and the second engaging claw 10b is performed by a second lever 10d by the user. As shown in FIG. 11, the second lever 10d is a sliding lever movable in the front-rear direction.

The position of the second engaging claw 10b relative to the second lever 10d is fixed and the second engaging claw 10b moves in the front and rear directions with the second lever 10d. The second lever 10d and the second engaging claw 10b are urged in a direction to maintain the engagement with the hook portion 33a (forward in the present embodiment) by an urging member such as a spring.

Further, the second lever 10d and the second engaging claw 10b are engaged with each other through a cam portion 10f, and the second lever 10d is moved rearward and thereby the second engaging claw 10b moves in a direction to release the engagement with the hook portion 33a.

Therefore, when the leg portion 23 is in the housed state (the state of FIG. 5), if the second lever 10d is moved rearward, the engagement of the hook portion 24a and the first engaging claw 10a is released and the engagement of the hook portion 33a and the second engaging claw 10b is released, the leg portion comes into the projected state, and the optical element holding frame 33 comes into the standing state (the state of FIG. 7). Further, when the leg portion 23 is in the projected state and the optical element holding frame 33 is in the lodged state (the state of FIG. 6), if the second lever 10d is moved rearward, the engagement of the hook portion 33a and the second engaging claw 10b is released, so that the optical element holding frame 33 comes into the standing state (the state of FIG. 7).

Under the front cover portion 24, a cam portion 24b is provided. The cam portion 24b is a part which causes the optical element holding frame 33 to move to the lodged state by coming in contact with the optical element holding frame 33 in standing state, when the light emitting unit 20 moves from the projected state to the housed state. In the case where the optical element holding frame 33 is in the standing state, if the user presses the light emitting unit 20 downward, the optical element holding frame 33 swings so as to be the lodged state in accordance with the swinging of the light emitting unit 20. If the light emitting unit 20 is pressed from the projected state to the housed state, the hook portion 33a comes into engagement with the second engaging claw 10b.

As described above, the image pickup apparatus 1 of the present embodiment allows the user to make only the light emitting unit 20 be in the projected state by operating the first lever 10c once if the user would like to use the illumination light by the light emitting unit 20 in picking up an image, and the user is allowed to make the sighting device 30, which is disposed under the light emitting unit 20, be in a state ready to use immediately by operating the second lever 10d once if the user would like to use the sighting device 30.

Further, at the body portion 10, there is disposed a second sensor 17 which detects whether or not the optical element holding frame 33 is positioned in the lodged state. In the present embodiment, as an example, the second sensor 17 is a photo-interrupter disposed in the vicinity of the third rotation shaft 34. A light shield piece 33b which protrudes in a direction orthogonal to the third rotation shaft 34 is formed at the optical element holding frame 33.

As shown in FIG. 5, the light shield piece 33b is provided at a position where the light shield piece is detected by the second sensor 17 which is the photo-interrupter when the optical element holding frame 33 is in the lodged state. The control apparatus 6 of the image pickup apparatus 1 determines whether or not the optical element holding frame 33 is in the lodged state based on a signal outputted from the second sensor 17.

Here, as shown as a table in FIG. 12, the control apparatus 6 determines whether a light emission operation of the light source portion 21 of the light emitting unit 20 is to be permitted or not and whether a light emission operation of the sighting device light source 31 of the sighting device 30 is to be permitted or not based on the signals outputted from the first sensor 16 and the second sensor 17.

Specifically, when the leg portion 23 is in the housed state, i.e. the light emitting unit 20 is housed in the body portion 10, the light emission of the light source portion 21 when picking up an image is prohibited and the light emission of the sighting device light source 31 is stopped. Further, when the leg portion 23 is in the projected state and the optical element holding frame 33 is in the lodged state, the light emission of the light source portion 21 when picking up an image is permitted and the light emission of the sighting device light source 31 is stopped. Further, when the leg portion 23 is in the projected state and the optical element holding frame 33 is in the standing state, the light emission of the light source portion 21 when picking up an image is prohibited and the light emission of the sighting device light source 31 is performed.

That is, in the image pickup apparatus 1 of the present embodiment, when the sighting device 30 is in use, the light emission of the light emitting unit 20 is prohibited. This is because a situation of trying to capture the object within the image pickup range using the sighting device 30 seems to be a situation where an effect of the illumination light cannot be obtained since the object is far away from the image pickup apparatus and also to be a situation where the emission of the illumination light is to be avoided such as a case of picking up an image of a wild animal. Besides, the prohibition of the light emission of the light emitting unit 20 when the sighting device 30 is in use may be released by a change of operation setting of the image pickup apparatus 1, for example.

As described above, in the present embodiment, it is possible to reduce the body portion 10 in size by housing the optical element holding frame 33 and the optical element 32 in the lodged state under the light emitting unit 20 in the housed state, and it is possible to make the light emitting unit 20 or the sighting device 30 ready to use immediately by operating one lever (10c or 10d) once, as necessary. Therefore, separate uses of the light emitting unit 20 and the sighting device 30 are made easy. Thus, operations for using the sighting device 30 do not become complicated by reduction of the size of the image pickup apparatus 1 which is provided with the sighting device 30. Further, when the sighting device 30 is ready for use, the light emission of the light emitting unit 20 is prohibited and therefore it is possible to prevent an erroneous operation of causing the light emitting unit 20 to emit light when picking up an image using the sighting device 30.

Next, the configuration of a light source position changing mechanism 40 that adjust a position of the sighting device light source 31 of the sighting device 30 will be described.

In the image pickup apparatus 1 of the present embodiment, the position of the sighting device light source 31 can be changed in order to eliminate influence of parallax between the image pickup lens 2 and the sighting device 30 which varies in accordance with a distance between the image pickup apparatus 1 and the object. In the following, the configuration of the light source position changing mechanism 40 which adjusts the position of the sighting device light source 31 of the sighting device 30 will be described.

Since the sighting device 30 is positioned just above the optical axis O of the image pickup lens 2, the parallax can be corrected by moving the sighting device light source 31 in an up/down direction with respect to the body portion 10.

The light source position changing mechanism 40 is provided with a light source holding portion 42, a support shaft 43, a compression coil spring 44, a cam 45 and a knob 41.

Figure 13:
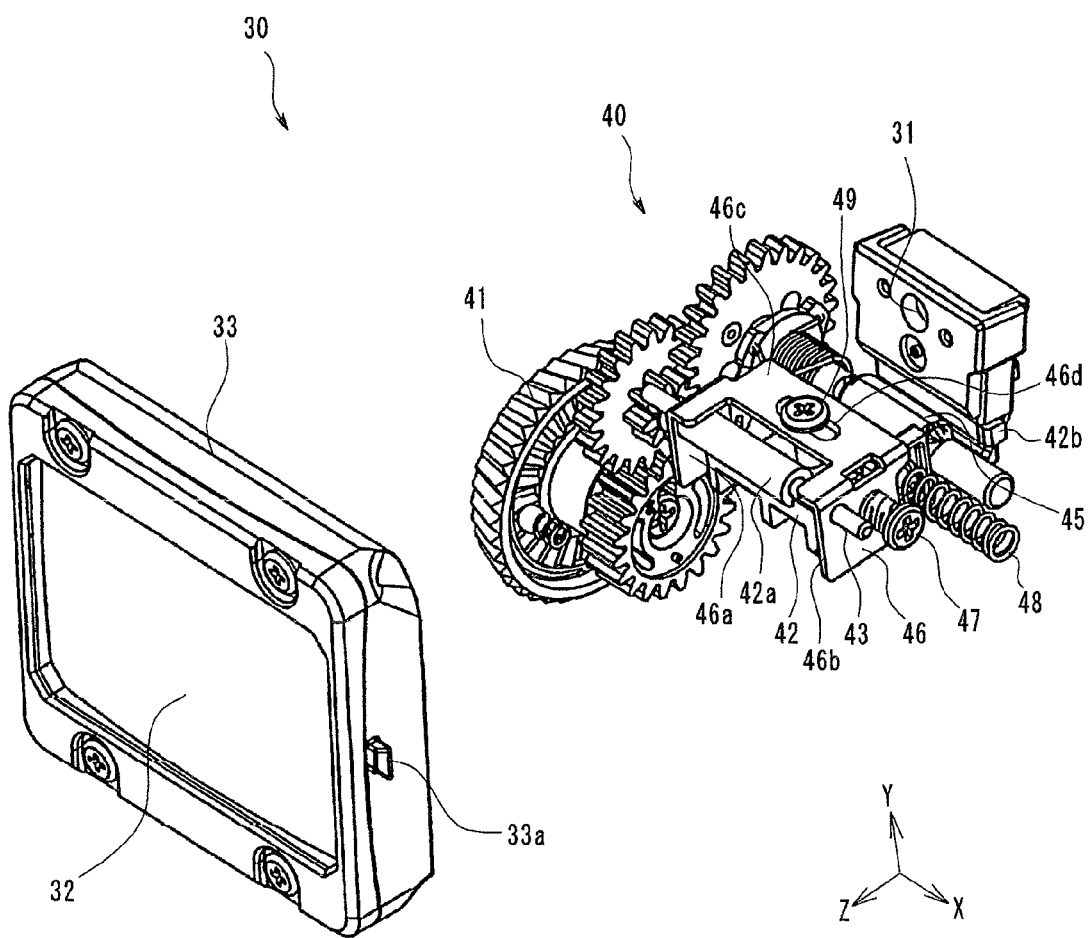
FIG. 13 is a perspective view of the sighting device only when viewed from front.
Figure 14:
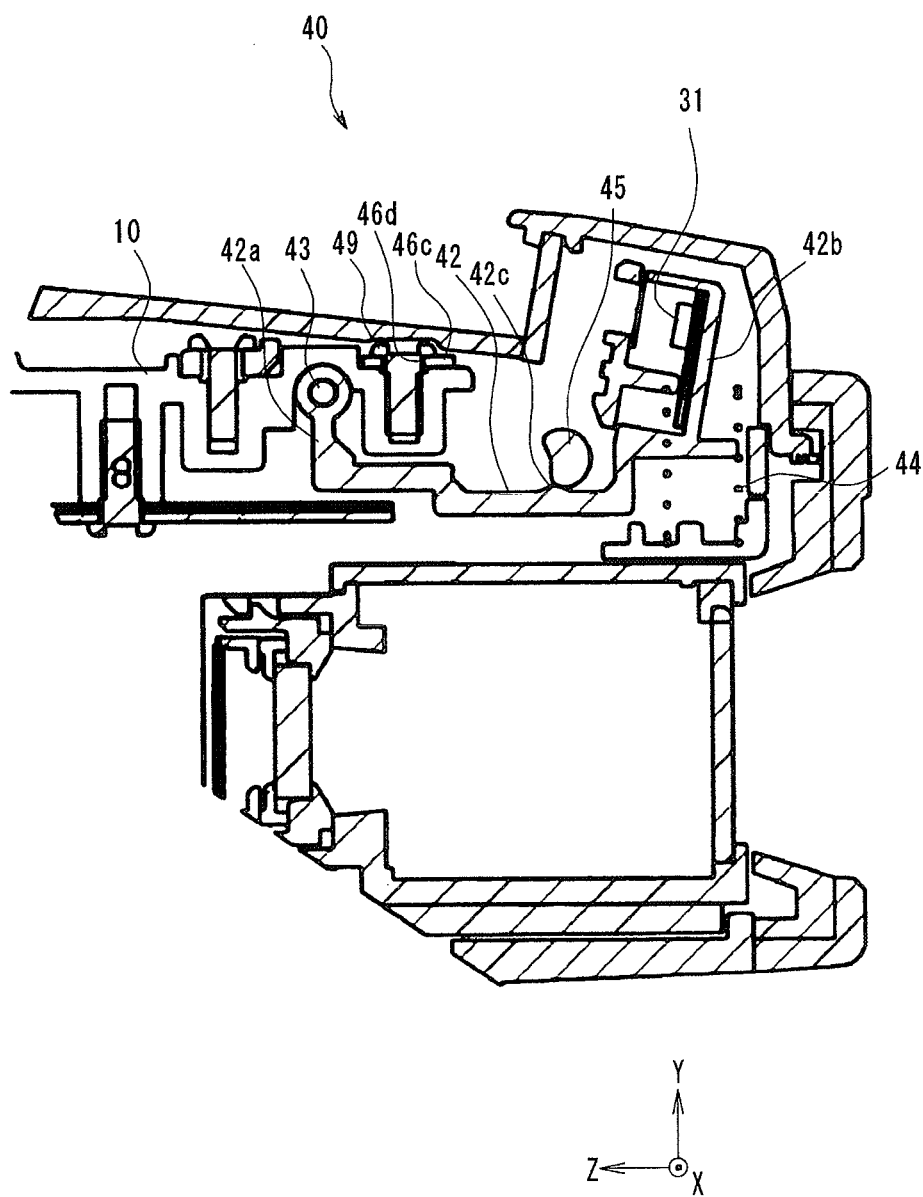
FIG. 14 is a sectional view of a light source position changing mechanism and a sighting device light source.

The light source holding portion 42 is disposed to be swingable around the support shaft 43 approximately parallel to the X axis at a base end portion 42a, as shown in FIGS. 13 and 14. The light source holding portion 42 extends rearward from the support shaft 43 and holds the sighting device light source 31 at a front end portion 42b. Further, a cam follower 42c is provided at the light source holding portion 42. The cam follower 42c is a part which comes in contact with the cam 45, as described later.

The cam 45 rotates around an axis approximately parallel to the X axis and it is formed such that a distance between a cam surface in contact with the cam follower 42c and the rotation axis varies in accordance with rotation of the cam 45. The light source holding portion 42 is urged in a direction of coming close to the cam 45 by the compression coil spring 44 so that the cam follower 42c is constantly in contact with the cam 45. That is, the light source holding portion 42 swings around the support shaft 43 by the rotation of the cam 45.

The knob 41 is a rotary member in the form of a dial, which is disposed on an outer surface of the body portion 10 at a position the user can touch. The cam 45 rotates as the knob 41 rotates. In the present embodiment, as shown in the drawings, the knob 41 is disposed to be rotatable around an axis approximately parallel to the X axis on a left side of the sighting device light source 31. In the present embodiment, the rotation of the knob 41 is transmitted to the cam 45 through a speed reduction mechanism constituted by a plurality of spur gears.

In the light source position changing mechanism 40 having the above-described configuration, the light source holding portion 42 swings around the support shaft 43 and the sighting device light source 31 moves in the up/down direction with respect to the body portion 10 by rotating the knob 41.

Hereinafter, an example of operations when the user corrects the parallax between the image pickup lens 2 and the sighting device 30 will be described. In the operation of parallax collection, first, the power switch 13 is operated to turn on the power supply of the image pickup apparatus 1. Next, the second lever 10d is moved rearward to project the light emitting unit 20 and make the optical element holding frame 33 be in the standing state. At this time, the light emission of the sighting device light source 31 is started, as described before.

Next, the zoom operation switch 14 is operated to make the focal length of the image pickup lens 2 to be the longest (a state of so-called tele end). It is noted that this operation may not be performed. Next, the back face switch 15 is operated to change the operation mode of the image pickup apparatus 1 to a sighting device adjusting operation mode. In the sighting device adjusting operation mode, a center of the image pickup range is shown by cross hairs, for example, in a live-view display on the image display apparatus 5.

Next, comparison is made between the live-view display displayed on the image display apparatus 5 and the sighting device 30, and the knob 41 is operated such that, in the sighting device 30, the image of the sighting device light source 31 is superimposed on an object located at the center of the image pickup range in the live-view image. Correction of parallax is completed when the image of the sighting device light source 31 is superimposed on the object located at the center of the image pickup range in the live-view display, in the sighting device 30.

As described above, the light source position changing mechanism 40 has a configuration for moving the sighting device light source 31 in the up/down direction (direction along the Y axis) with respect to the body portion 10 in accordance with the rotation of the knob 41. In addition, in the present embodiment, the light source position changing mechanism 40 has a configuration for moving the sighting device light source 31 in the horizontal direction (direction along the X axis) with respect to the body portion 10, as one example.

Figure 17:
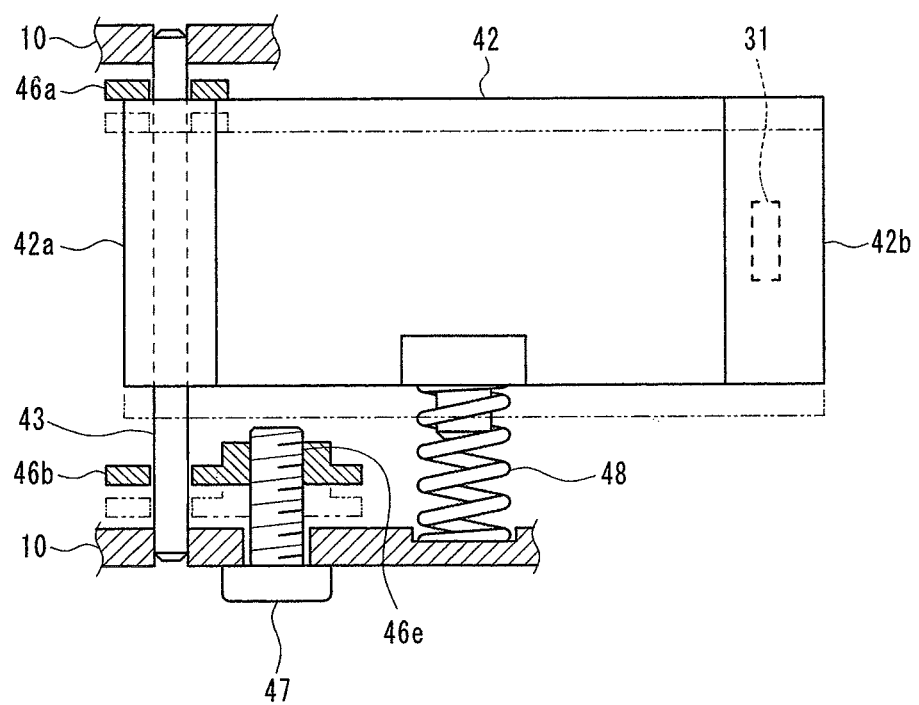
FIG. 17 is a schematic view of a configuration for moving the sighting device light source of the light source position changing mechanism in a direction along an X axis.

Hereinafter, description will be made on the configuration of the light source position changing mechanism 40 for moving the sighting device light source 31 in the horizontal direction (direction along the X axis) with respect to the body portion 10. FIG. 16 is a view showing a state where a cover member which covers the light source position changing mechanism 40 is removed from the body portion 10. FIG. 17 is a schematic view of a configuration for moving the sighting device light source 31 of the light source position changing mechanism 40 in the direction along the X axis.

As shown in FIG. 17, the light source holding portion 42 which holds the sighting device light source 31 slides in the direction along the X axis along the support shaft 43 which penetrates the base end portion 42a.

A positioning member 46 is fitted onto the support shaft 43. The positioning member 46 is a member having a substantially square U-shape, and includes a top surface 46c constituted by a plane facing upward and a pair of side surfaces 46a, 46b which extend downward from both ends in the right/left direction of the top surface 46c and are substantially orthogonal to the X axis.

The support shaft 43 penetrates the holes formed on the pair of side surfaces 46a, 46b of the positioning member 46. Clearances are formed between the support shaft 43 and the holes formed on the pair of side surfaces 46a, 46b. Furthermore, the base end portion 42a of the light source holding portion 42 is disposed between the pair of side surfaces 46a and 46b of the positioning member 46.

As shown in FIGS. 8 and 13, a long hole 46d is drilled on the top surface 46c of the positioning member 46, with the longitudinal direction of the long hole being the direction along the X axis. The positioning member 46 is inserted into the long hole 46d from the upper side, to be fixed to the body portion 10 with a fixing screw 49 which is screwed to the body portion 10, as shown in FIGS. 14 and 16.

As shown in FIG. 17, the light source holding portion 42 is urged with a compression coil spring 48 so as to abut against the one side surface 46a (right side surface) of the positioning member 46. In addition, a screw hole 46e as a female screw portion which is substantially parallel to the X axis is provided on the other side surface 46b (left side surface) of the positioning member 46. As shown in FIGS. 16 and 17, an adjusting screw 47 inserted through a through hole formed on the body portion 10 is screwed into the screw hole 46e.

In the state where the fixing screw 49 is loosened in such a configuration, the positioning member 46 moves forward and backward in the direction parallel to the X axis in accordance with the rotation of the adjusting screw 47. Since the light source holding portion 42 abuts against the one side surface 46a of the positioning member 46 with the urging force of the compression coil spring 48, the light source holding portion 42 moves forward and backward in the direction parallel to the X axis together with the positioning member 46 in accordance with the rotation of the adjusting screw 47.

If the fixing screw 49 is then fastened, the positioning member 46 is fixed to the body portion 10. According to this fixation of the positioning member 46, the position in the direction parallel to the X axis of the light source holding portion 42 which abuts against the one side surface 46a of the positioning member 46 is also fixed.

As described above, the light source position changing mechanism 40 of the present embodiment is capable of moving the light source holding portion 42 that holds the sighting device light source 31 in the direction along the X axis with respect to the body portion 10 by loosening the fixing screw 49 and thereafter rotating the adjusting screw 47, thereby capable of correcting the parallax.

According to the image pickup apparatus 1 having the sighting device 30 of the present embodiment as described above, the sighting device 30 is disposed under the light emitting unit 20, and when the light emitting unit 20 is in the housed state, the optical element holding frame 33 is brought into the lodged state, and thereby the sighting device 30 is housed so as to hide under the light emitting unit 20. That is, the front cover portion 24 included in the light emitting unit 20 also functions as a cover member that houses the optical element holding frame 33 and the optical element 32. Therefore, a cover member for protecting only the sighting device 30 is not required in the present embodiment, which enables the size reduction of the image pickup apparatus 1.

In addition, in the image pickup apparatus 1 of the present embodiment, the sighting device 30 is disposed so as to pass through the opening portion 23c of the leg portion 23 of the light emitting unit 20. Furthermore, when the sighting device 30 is ready for use, that is, the optical element holding frame 33 is in the standing state, the rear cover portion 25 that moves in accordance with the standing action of the optical element holding frame 33 is located above the sighting device 30.

Thus, in the image pickup apparatus 1 of the present embodiment, the leg portion 23 of the light emitting unit 20 is located on the left and right of the sighting device 30 and the rear cover portion 25 is located above the sighting device 30 when the sighting device 30 is ready for use, thereby enabling the leg portion 23 and the rear cover portion 25 to function as a hood for preventing entry of unnecessary light into the sighting device 30. Therefore, visibility of the sighting device 30 is improved in the present embodiment. As described above, the present invention is capable of providing a small-sized image pickup apparatus 1 having the sighting device 30 with high visibility.

Furthermore, when the sighting device 30 is ready for use, it is possible to prevent adhesion of dust to the optical element by surrounding around the sighting device 30 by the leg portion 23 and the rear cover portion 25. In addition, in the present embodiment, the user peers into the sighting device 30 surrounded by the leg portion 23 and the rear cover portion 25, which naturally guides the user's point of view onto the optical path of the sighting device light source 31. Such a configuration enables easy use of the sighting device.

It is noted that the present invention is not limited to the above-described embodiments, and can be changed as appropriate without departing from a range of the gist or concept of the invention which can be read from claims and the entire description, and image pickup apparatuses thus changed are also included in the technical range of the present invention.

Figure 15:
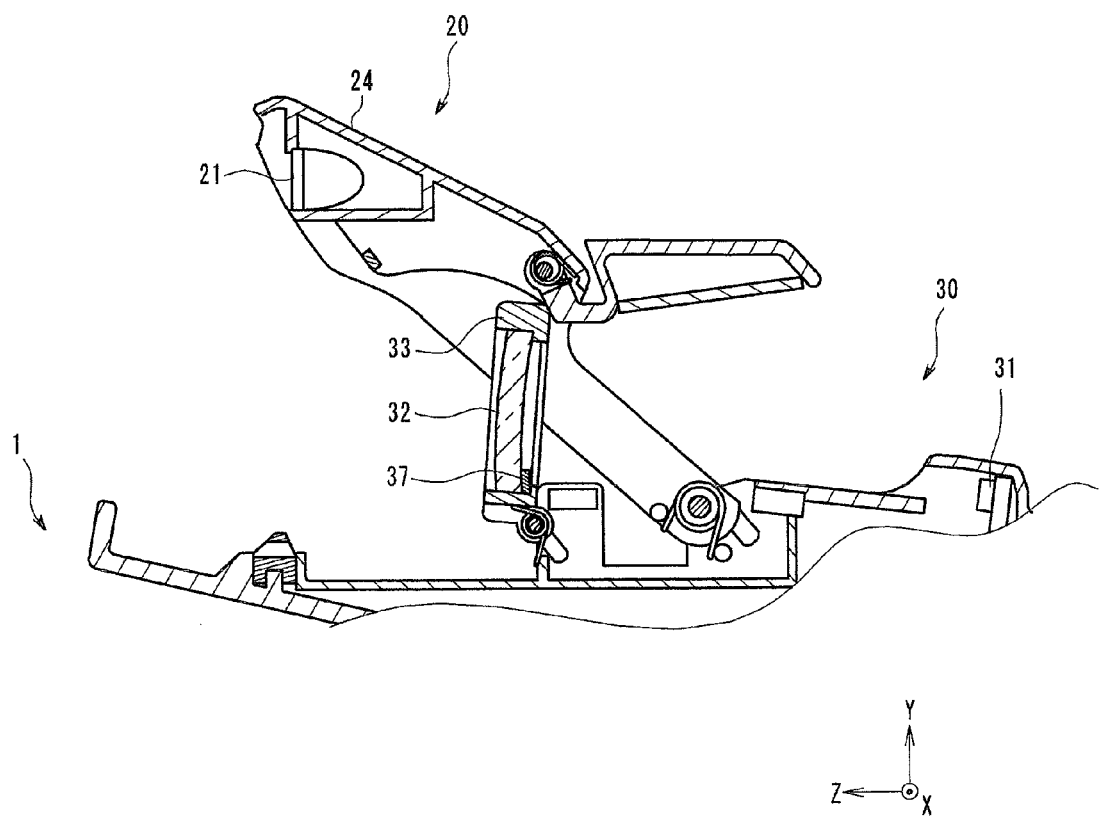
FIG. 15 is a sectional view showing a modified example of the sighting device.

For example, as shown in FIG. 15 as a modified example of the sighting device 30, if an ultrasound transducer 37 that oscillates the optical element 32 is provided to the sighting device 30, it is possible to shake off the dust adhered to the optical element 32 by driving the ultrasound transducer 37, thereby preventing a decrease in the visibility of the sighting device 30. In this case, in order to oscillate the entirety of the optical element 32 with the ultrasound transducer 37, it is preferable that the optical element 32 is attached to the optical element holding frame 33 through a member having elasticity such as gel-like resin.

In addition, for example, the portable optical instrument according to the present invention is not limited to an image pickup apparatus, what is called a digital camera (including lens-changeable type), but may be a form of binoculars or a telescope, or may be a form of electronic instrument provided with an image pickup function, such as a portable communication terminal, a gaming machine, a digital media player, and the like.

What is claimed is:

1. A portable optical instrument comprising:
   a body portion to which a lens barrel that holds a lens is fixed;
   a light emitting unit including a leg portion that swings relatively to the body portion around a first rotation shaft which is parallel to an axis orthogonal to an optical axis of the lens, and a light source portion for illumination provided at a front end of the leg portion, the light emitting unit moving between a housed state in which the leg portion is along an outer surface of the body portion and a projected state in which the leg portion stands up with respect to the outer surface and the light source portion projects from the body portion; and
   a sighting device which includes an optical element having a concave-surface-shaped reflection surface, and a sighting device light source opposed to the reflection surface, the sighting device being configured to form a reflection light of the sighting device light source, wherein
   the optical element is disposed between the body portion and the light emitting unit when the light emitting unit is in the housed state,
   the light emitting unit includes a front cover portion which covers the light source portion in the housed state, an opening portion which penetrates the leg portion in a direction along the optical axis in the projected state, and a rear cover portion which opens and closes the opening portion by swinging relatively to the leg portion around a second rotation shaft parallel to the first rotation shaft on a more distal end side of the leg portion than the opening portion, the sighting device is disposed so as to penetrate the opening portion when the light emitting unit is in the projected state, the optical element is held by an optical element holding frame which swings relatively to the body portion around a third rotation shaft parallel to the first rotation shaft, and the optical element holding frame is brought into a lodged state in which the optical element holding frame is along the outer surface of the body portion, when the sighting device is not used, and the optical element holding frame is brought into a standing state in which the optical element holding frame stands up with respect to the outer surface and presses the rear cover portion in a direction for opening the opening portion in the standing state, when the sighting device is used.

2. The portable optical instrument according to claim 1, wherein the sighting device includes a rotatable knob which is exposed on the outer surface of the body portion, and a light source position changing mechanism which moves the sighting device light source in a direction orthogonal to the optical axis in accordance with rotation of the knob.

3. The portable optical instrument according to claim 1, wherein the sighting device includes a rotatable knob which is exposed on the outer surface of the body portion, and a light source position changing mechanism which moves the sighting device light source in a direction orthogonal to the optical axis in accordance with rotation of the knob.

4. An image pickup apparatus comprising:
a lens barrel which holds an image pickup lens;
a body portion to which the lens barrel is fixed;
a light emitting unit including a leg portion that swings relatively to the body portion around a first rotation shaft which is parallel to an axis orthogonal to an optical axis of the image pickup lens, and a light source portion for illuminating an object, which is provided on a front end of the leg portion, the light emitting unit moving between a housed state in which the leg portion is along an outer surface of the body portion and a projected state in which the leg portion stands up with respect to the outer surface and the light source portion projects from the body portion; and
a sighting device which includes an optical element having a concave-surface-shaped reflection surface, and a sighting device light source opposed to the reflection surface, the sighting device being configured to form a reflection light of the sighting device light source, wherein the light emitting unit includes an opening portion which penetrates the leg portion in a direction along the optical axis in the projected state, wherein the sighting device is disposed so as to penetrate the opening portion when the light emitting unit is in the projected state, the optical element is held by an optical element holding frame which swings relatively to the body portion around a rotation shaft parallel to the first rotation shaft, the optical element holding frame is brought into a lodged state in which the optical element holding frame is along the outer surface of the body portion, when the sighting device is not used, and the optical element holding frame is brought into a standing state in which the optical element holding frame stands up with respect to the outer surface, when the sighting device is used, and the image pickup apparatus enables an operation for moving only the light emitting unit from the housed state to the projected state, and an operation for moving the light emitting unit from the housed state to the projected state and simultaneously moving the optical element holding frame from the lodged state to the standing state.

5. The image pickup apparatus according to claim 4, further comprising:
a first urging member which urges the light emitting unit in a direction for moving the light emitting unit from the housed state to the projected state;
a second urging member which urges the optical element holding frame in a direction for moving the optical element holding frame from the lodged state to the standing state;
a first engaging portion which engages with the light emitting unit and maintains the light emitting unit in the housed state;
a second engaging portion which engages with the optical element holding frame and maintains the optical element holding frame in the lodged state;
a first lever which is exposed on the outer surface of the body portion and inputs an operation for moving the first engaging portion and releasing an engagement between the first engaging portion and the light emitting unit; and
a second lever which is exposed on the outer surface of the body portion and inputs an operation for simultaneously moving the first engaging portion and the second engaging portion and releasing the engagement between the first engaging portion and the light emitting unit and an engagement between the second engaging portion and the optical element holding frame.

* * * * *